(12) United States Patent
Kubo et al.

(10) Patent No.: US 8,534,923 B2
(45) Date of Patent: Sep. 17, 2013

(54) ROLLING BEARING DEVICE FOR A ROAD-WHEEL, A METHOD OF MANUFACTURING THE SAME AND A TURNING APPARATUS FOR A BEARING MEMBER

(75) Inventors: Tomomasa Kubo, Toyota (JP); Tatsuya Yokota, Toyota (JP)

(73) Assignee: JTEKT Corporation, Osaka (JP)

( * ) Notice: Subject to any disclaimer, the term of this patent is extended or adjusted under 35 U.S.C. 154(b) by 429 days.

(21) Appl. No.: 13/005,382

(22) Filed: Jan. 12, 2011

(65) Prior Publication Data

US 2011/0103732 A1 May 5, 2011

Related U.S. Application Data

(62) Division of application No. 11/791,515, filed as application No. PCT/JP2005/021468 on Nov. 22, 2005, now Pat. No. 7,886,441.

(30) Foreign Application Priority Data

Nov. 26, 2004 (JP) ................................ 2004-342585
Nov. 26, 2004 (JP) ................................ 2004-342586

(51) Int. Cl.
*F16C 13/00* (2006.01)
(52) U.S. Cl.
USPC .......... 384/544; 384/543; 29/898; 29/898.06; 29/898.061; 403/274
(58) Field of Classification Search
USPC .............. 29/898.061, 898, 898.06; 384/543, 384/544; 403/274
See application file for complete search history.

(56) References Cited

U.S. PATENT DOCUMENTS 5,490,732 A 2/1996 Hofmann et al.
(Continued)

FOREIGN PATENT DOCUMENTS

EP 1312819 A1 5/2003
JP 2-30447 A 1/1990
(Continued)

OTHER PUBLICATIONS

CD-ROM of the specification and drawings annexed to the request of Japanese Utility Model Application No. 101894/1991 (Laid-open No. 41623/1993) (Kabushiki Kaisha Oputeikon), Jun. 8, 1993.

(Continued)

*Primary Examiner* — Richard Chang
(74) *Attorney, Agent, or Firm* — Birch, Stewart, Kolasch & Birch, LLP

(57) ABSTRACT

In a rolling bearing device for a road-wheel including an inner shaft 1 that is provided with, on its outer-side end 10, a flange 4 on which a road-wheel member mounted, and an outer ring 2 disposed around the inner shaft 1, the inner shaft has, on its outer side, a hair-line pattern portion 5 that is formed by turning and that permits the manufacturing attribute of the bearing device to be identified based on the difference in the form of hair lines so formed. This permits the manufacturing attribute of the bearing device to be identified after the bearing device is assembled in a vehicle body. Furthermore, the representation of the manufacturing attribute can be readily implemented during a manufacturing step.

5 Claims, 9 Drawing Sheets

(56) References Cited

U.S. PATENT DOCUMENTS

| | | | |
|---|---|---|---|
| 6,497,515 B1* | 12/2002 | Sahashi et al. | 384/544 |
| 6,581,287 B2* | 6/2003 | Sawai et al. | 29/898.062 |
| 6,785,965 B2* | 9/2004 | Sawai et al. | 29/898.062 |
| 6,814,495 B2* | 11/2004 | Toda et al. | 384/544 |
| 6,928,737 B2* | 8/2005 | Ishida et al. | 29/898.062 |
| 6,971,177 B2* | 12/2005 | Ozawa et al. | 29/898.062 |
| 6,996,907 B2* | 2/2006 | Toda et al. | 29/898.062 |
| 7,099,728 B2* | 8/2006 | Urabe | 700/109 |
| 7,125,173 B2* | 10/2006 | Toda et al. | 384/544 |
| 7,896,553 B2* | 3/2011 | Sahashi et al. | 384/448 |
| 2002/0186134 A1 | 12/2002 | Rehfus et al. | |
| 2004/0022469 A1 | 2/2004 | Ozawa et al. | |
| 2004/0123464 A1 | 7/2004 | Nagano | |
| 2005/0071032 A1* | 3/2005 | Urabe | 700/109 |

FOREIGN PATENT DOCUMENTS

| | | |
|---|---|---|
| JP | 6-96297 A | 4/1994 |
| JP | 2001-162338 A | 6/2001 |
| JP | 2002-227863 A | 8/2002 |
| JP | 2003-113848 A | 4/2003 |
| JP | 2003-222146 A | 8/2003 |
| JP | 2003-290865 A | 10/2003 |
| JP | 2004-162913 A | 6/2004 |
| JP | 2004-167668 A | 6/2004 |
| JP | 2004-225752 A | 8/2004 |
| JP | 2004-263724 A | 9/2004 |

OTHER PUBLICATIONS

Microfilm of the specification and drawings annexed to the rquest of Japanese Utility Model Application No. 109477/1986 (Laid-open No. 16521/1988) (Hitachi Metals, Ltd.), Feb. 3, 1988.

* cited by examiner (a)

(b)

(a)

(b)

US 8,534,923 B2

ROLLING BEARING DEVICE FOR A ROAD-WHEEL, A METHOD OF MANUFACTURING THE SAME AND A TURNING APPARATUS FOR A BEARING MEMBER

CROSS-REFERENCE TO RELATED APPLICATIONS

This application is a Divisional of application Ser. No. 11/791,515 filed on May 24, 2007 now U.S. Pat. No. 7,886,441 and for which priority is claimed under 35 U.S.C. §120. Application Ser. No. 11/791,515 is the national phase of PCT International Application No. PCT/JP2005/021468 filed on Nov. 22, 2005 under 35 U.S.C. §371 and which claims priority to Application Nos. 2004-342585 and 2004-342586 filed in Japan on Nov. 26, 2004, respectively. The entire contents of each of the above-identified applications are hereby incorporated by reference.

TECHNICAL FIELD

The present invention relates to a rolling bearing device for a road-wheel (hereinafter, also referred to simply as a rolling bearing device) that is used for a hub unit or the like loaded in an automotive vehicle, a method of manufacturing the same and a turning apparatus for a bearing member.

BACKGROUND ART

Conventionally known rolling bearing devices for road-wheels on which road wheels of automotive vehicles or the like are mounted include one which has an inner shaft that is provided with, on its outer-side end, a flange on which the road wheel is mounted; and has an outer ring disposed around the inner shaft. The outer ring is fixed to a member of a vehicle body, whereby the rolling bearing device is assembled in the vehicle body.

By the way, the completed rolling bearing devices may be stored in warehouses, put in the stage of distribution or assembled in final products to be introduced on the market. If, in such cases, inspections or replacements of the rolling bearing device are necessary for various reasons, it is crucial to confirm the manufacturing attribute of the rolling bearing device in question, or to confirm the serial number or lot number, and the numerical quantity thereof.

In this connection, characters representing the date of manufacture and the like of the rolling bearing device may be die-stamped on a part of the surface thereof, thus offering information on the manufacturing attribute of the rolling bearing device. A rolling bearing wherein the characters for the identification of the manufacturing attribute thereof are represented on a bearing surface by die-stamping may be exemplified by one disclosed in Japanese Unexamined Patent Publication No. 2003-222146 (FIG. 1).

On the other hand, a vehicular hub unit may be constituted by a rolling bearing device including: a hub wheel (inner shaft) as a shaft body to which a road wheel, a disc rotor of a disc brake gear and the like are mounted; and a rolling bearing mounted on an outer periphery of the hub wheel for supporting the hub wheel. As disclosed in Japanese Unexamined Patent Publication No. 2001-162338, for example, such a rolling bearing device is constituted as follows. A cylindrical end of the above-mentioned hub wheel is radially outwardly bent and deformed, so as to be caulk-fixed to an axial end face of an inner ring of the above-mentioned bearing, whereby the end face of the inner ring is axially pressed for preventing the bearing from disengaging from the hub wheel.

Specifically, as shown in FIG. 9, the conventional rolling bearing device of this type includes: an outer ring member 101 which has a pair of outer raceways 101a, 101b and is fixed to the vehicle body side; a hub wheel 102 which includes an inner raceway 102a opposing the outer raceway 101a and allows the road wheel to be mounted to a vehicular-outer-side end thereof; an inner ring member 103 which is fitted on a vehicular-inner-side end of the hub wheel 102 and on which an inner raceway 103a opposing the outer raceway 101b is formed; and rolling elements 104, 105 which are constituted by balls rollably interposed between a respective pair of outer raceways 101a, 101b and inner raceways 102a, 102b in an opposing relation.

The inner ring member 103 is prevented from disengaging from the hub wheel 102 by means of a caulked portion 102b formed by bending and deforming a cylindrical end of the hub wheel 102 in a radially outward direction.

In the conventional rolling bearing device, a cover 106 is pressed into an inner periphery of a vehicular-inner-side of the outer ring member 101 in order to increase muddy water resistance. A vehicular-inner-side opening of the bearing device is sealed by the cover 106. On the other hand, a vehicular-outer-side opening of the bearing device is sealed by a seal member 107 interposed between the outer ring member 101 and the hub wheel 102.

DISCLOSURE OF THE INVENTION

Problems to be Solved by the Invention

It is expected that quite a large number of man-hours is required for quality control in a case where information items related to a manufacturing history (including measured data) of a product among the manufacturing attributes are not systematically managed.

Such a problem may be solved to some extent, for example, by preparing a sheet for one product, which carries information such as the above-mentioned manufacturing history. However, such a management on a "sheet-per-product" basis is not realistic because this management system is cumbersome and requires a large-scale facility.

The bearing disclosed in Japanese Unexamined Patent Publication No. 2003-222146 further has the following drawback. Once the bearing is assembled in a device and disposed in an innermost area of the device, it may be difficult to confirm the attribute of the bearing device afterwards. There is another problem that an area where the characters are die-stamped is rusted as the bearing device is used for a long time, so that the die-stamped characters may become unreadable if they are so small. Some products provided with the die-stamped characters may carry only information on the date of manufacture and the size. This may lead to a fear that a substantial length of time is taken to identify the above-mentioned manufacturing attribute. In short, the die-stamped mark falls short of ensuring an exact and quick trace of the product.

In the above-mentioned rolling bearing device for a road-wheel including the inner shaft and the outer ring, it may be contemplated, for example, to die-stamp the characters on a back side of the flange of the inner shaft, which is opposite to a side to which a road-wheel side member is mounted. Unfortunately, however, this back side of the flange is directed inwardly in a state where the rolling bearing device is assembled in the vehicle body. Therefore, it is impossible to visually confirm the die-stamped characters from outside. In a case where the characters are die-stamped on the bearing surface, another machine is required for performing an additional step of die-stamping the characters after the manufacture of the outer ring member or the inner ring member, or after the fabrication of the bearing. This results in a problem that increased labor and time is taken.

On the other hand, it has been a conventional practice for bearing manufacturers to inspect the rolling bearing device including the caulked portion, as shown in FIG. 9, by using, for example, a phototube or the like, in order to determine whether the caulked portion 102*b* is formed properly or not.

As shown in FIG. 9, however, the conventional rolling bearing device, as described above, has the cover 106 pressed into the inner periphery of the outer ring member 101 in a manner to cover the caulked portion 102*b*. Once the cover 106 is mounted, therefore, the cover 106 must be removed to confirm the existence or nonexistence of the caulked portion 102*b*. This makes it difficult to check the caulked portion 102*b*. Also because the caulked portion 102*b* and the cover 106 are disposed on a vehicular inner side after the conventional rolling bearing device is assembled in the vehicle, it is never easy to determine on the existence or nonexistence of the caulked portion 102*b*.

In view of the foregoing problems, it is the first object of the invention to provide a rolling bearing device for a road-wheel which facilitates a post-assembly confirmation of the manufacturing attribute thereof and which permits a manufacturing step to readily implement the representation of the attribute. It is also the first object of the invention to provide a rolling bearing device for a road-wheel which provides an easy trace of a product shipped from factory and an easy identification of a lot number or a serial number of the relevant product if inspections or replacements thereof are necessary and the like, and which permits the quality control thereof to be accomplished by a small man-hour, as well as to provide a turning apparatus for a bearing member, which is capable of enhancing the traceability of the rolling bearing device in this manner.

It is the second object of the invention to provide a rolling bearing device for a road-wheel which permits the existence or nonexistence of the caulked portion to be easily checked even when the cover is so mounted as to cover the caulked portion, as well as to provide a method of manufacturing the same.

Means for Solving the Problems

According to the invention for achieving the above-mentioned first object thereof, a rolling bearing device for a road-wheel comprises: an inner shaft that is provided with, on its outer-side end, a flange on which a road-wheel side member is mounted; and an outer ring disposed around the inner shaft, and is characterized in that the inner shaft has, on its outer side, a hair-line pattern portion that is formed by turning and that permits a manufacturing attribute of the bearing device to be identified based on the difference in the form of hair lines so formed.

According to the rolling bearing device for a road-wheel constituted as described above, the hair-line pattern portion exists on the outer side of the inner shaft so that after the rolling bearing device is assembled in a vehicle body, the representation of the hair-line pattern portion can be readily confirmed from outside in a state where the bearing device stays assembled in the vehicle body, without dismounting the rolling bearing device from the vehicle body. That is, if the correlation between forms of the hair-line pattern portions and characters is previously defined and a hair-line pattern portion corresponding to characters to be represented is formed on an outer-side surface of the inner shaft, the contents of the representation (characters) can be read by checking the hair-line pattern portion later. Therefore, the rolling bearing device for a road-wheel can be enhanced in the traceability of the manufacturing attribute including the date of manufacture, processing conditions and the like.

As another advantage, the hair-line pattern portion is formed by turning. Hence, the hair-line pattern portion can be formed in parallel with the turning of the inner shaft.

It is also preferred that the hair-line pattern portion is formed on an internal surface of a guide cylinder which is disposed at an inner side portion of the flange and serves as a guide during mounting the road-wheel side member to the flange. This constitution is advantageous in the following sense. After the vehicle is completed, the manufacturing attribute of the rolling bearing device can be readily acquired by removing a wheel of the road wheel as the road-wheel side member from the flange of the rolling bearing device. Furthermore, the guide cylinder suffers less rust production on the internal surface thereof because the infiltration of water from outside is suppressed. Accordingly, the hair-line pattern portion can be maintained as it is over an extended period of time.

According to the invention for achieving the above-mentioned first object thereof, a turning apparatus for a bearing member comprises: turning condition processing means for deciding turning conditions of a turning tool according to information about a manufacturing attribute on a bearing member and generating a tool operation control signal based on the turning conditions; and turning tool drive means for operating the turning tool according to the tool operation control signal provided by the turning condition processing means, thereby implementing the information about the manufacturing attribute in a hair-line pattern portion which is formed by turning the bearing member, and which permits the manufacturing attributes to be identified based on the difference in the form of hair lines so formed.

According to the turning apparatus for a bearing member constituted as described above, the hair-line pattern portion representing the information about the manufacturing attribute on the bearing member can be automatically formed when the bearing member is formed by turning. Hence, the turning apparatus provides the man-hour reduction. In short, the turning apparatus negates the need for an additional step of imparting a product with a die stamp permitting the identification of the manufacturing attribute.

According to the invention for achieving the above-mentioned second object thereof, a rolling bearing device for a road-wheel which comprises: an outer ring; an inner ring member; rolling elements arranged between the outer ring and the inner ring member; and a shaft body having the inner ring member mounted to an outer periphery thereof and in which a caulked portion to be caulked to an axial end face of the inner ring member is formed at one end side of the shaft body, thereby fixing the inner ring member to the shaft body, the bearing device is characterized in that the caulked portion is caulked to the axial end face of the inner ring member by performing a caulking process in which a cylindrical portion formed at the one end side of the shaft body is radially outwardly bent and deformed by using a predetermined caulking pressure acting from the one end side toward the other end side of the shaft body, and in that identification information indicating the existence of the caulked portion so formed is die-stamped on a visually observable surface at the other end side of the shaft body by using the caulking pressure of the caulking process.

In the rolling bearing device for a road-wheel constituted as described above, the identification information indicating the existence of the caulked portion so formed is die-stamped on the visually observable surface at the other end side of the shaft body. Therefore, the existence or nonexistence of the caulked portion can be readily determined from the die-stamped identification information, even if such a cover as to cover the caulked portion is mounted to the one end side of the shaft body. Since the identification information is die-stamped by using the caulking pressure of the caulking process, the die-stamping of the identification information in the above-mentioned surface can be accomplished at the completion of the caulking process. This negates the need for an additional step of die-stamping the identification information.

It is preferred in the above-mentioned rolling bearing device for a road-wheel that includes: at the other end side of the shaft body, a flange which is disposed in a concentric relation with the cylindrical portion at its one end and connected to a road-wheel side of a vehicle; and a socket part having a cylindrical portion which is disposed in a concentric relation with the cylindrical portion and pressed against the road-wheel side at its outer periphery and a bottom portion which is enclosed by the cylindrical portion, and that the identification information is die-stamped on a surface of the bottom portion.

In this case, the identification information die-stamped on the surface of the bottom portion provides the easy confirmation of the existence of the caulked portion so formed, even if the rolling bearing device is assembled in the vehicle by connecting the flange to the road-wheel side of the vehicle and pressing the cylindrical portion against the road-wheel side. What is more, the identification information is die-stamped on the surface of the bottom portion and hence, legible identification information can be provided without impairing the flatness or the like of the flange.

According to the invention for achieving the above-mentioned second object thereof, a method of manufacturing a rolling bearing device for a road-wheel including: an outer ring; an inner ring member; rolling elements arranged between the outer ring and the inner ring member; and a shaft body having the inner ring member mounted to its outer periphery, the method comprises a caulking step of radially outwardly bending and deforming a cylindrical portion formed at one end side of the shaft body by using a predetermined caulking pressure acting from the one end side toward the other end side of the shaft body, thereby forming a caulked portion caulked to an axial end face of the inner ring member, and is characterized in that identification information indicating the existence of the caulked portion so formed is die-stamped on a visually observable surface at the other end side of the shaft body by using the caulking pressure during the caulking step.

In the method of manufacturing the rolling bearing device for a road-wheel constituted as described above, the identification information indicating the existence of the caulked portion so formed is die-stamped on the visually observable surface at the other end side of the shaft body during the caulking step of forming the caulked portion. Therefore, even when the cover is mounted to the one end side of the shaft body so as to cover the caulked portion, the existence or nonexistence of the caulked portion can be readily determined from the identification information die-stamped at the other end side of the shaft body without removing the cover. Furthermore, the die-stamping of the identification information in the above-mentioned surface can be accomplished at the completion of the caulking process. This negates the need for the additional step of die-stamping the identification information so that the man-hours of manufacturing the rolling bearing device can be reduced. Thus is prevented the increase in cost of the bearing device.

In the above-mentioned method of manufacturing the rolling bearing device for a road-wheel, an identification information imparting jig for die-stamping the identification information can be pressed against the visually observable surface during the caulking step.

In this case, the identification information imparting jig, as subjected to the above-mentioned caulking pressure during the caulking process, utilizes the caulking pressure for die-stamping the identification information in the visually observable surface. This permits the caulking process including the operation of die-stamping the identification information to be carried out in a more stable manner and besides, the legible identification information can be die-stamped by efficiently using the caulking pressure.

It is preferred in the above-mentioned method of manufacturing the rolling bearing device for a road-wheel that the identification information is constituted by manufacturing information specific to the rolling bearing device.

In this case, the manufacturing information specific to the rolling bearing device is also used as the above-mentioned identification information, so as to negate the need for separately die-stamping the identification information and the manufacturing information. Thus is reduced the man-hours of manufacturing the rolling bearing device. Furthermore, the management of the usage history of the rolling bearing device and the like can be facilitated because the manufacturing information specific to the rolling bearing device is die-stamped.

BEST MODES FOR CARRYING OUT THE INVENTION

The embodiments of the invention will hereinafter be described with reference to the accompanying drawings.

Figure 1:
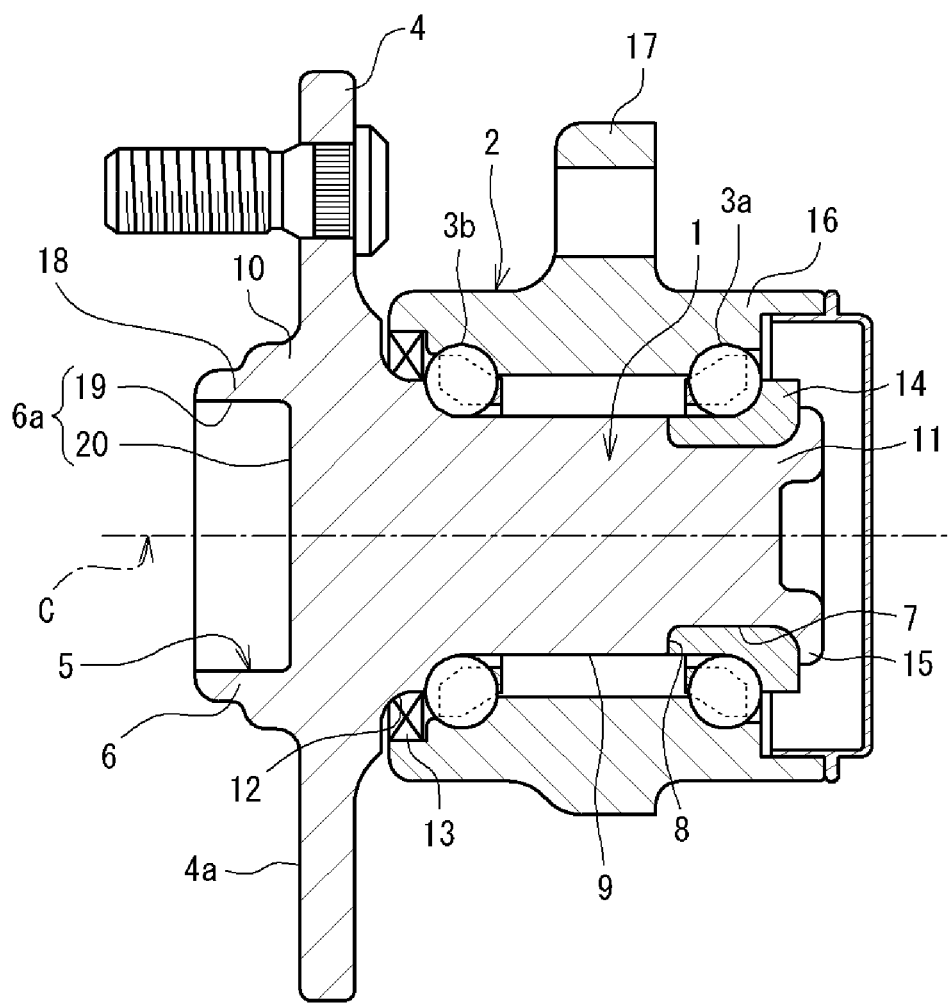
FIG. 1 is a vertical sectional view showing a rolling bearing device for a road-wheel according to the first embodiment of the invention.

FIG. 1 is a vertical sectional view showing a rolling bearing device for a road-wheel according to the first embodiment of the invention. The rolling bearing device for a road-wheel can be used for a road wheel of a vehicle such as an automotive vehicle. The rolling bearing device includes: an inner shaft 1 that is provided with, on its outer-side (outside) end 10, a flange 4 on which a road-wheel side member is mounted; and an outer ring 2 disposed around the inner shaft 1. The road-wheel side member (not shown) mounted to the flange 4 includes a wheel of the road wheel and a brake rotor for disc brake.

An inner ring member 14 is fitted on an inner-side (inside) end 11 of the inner shaft 1. The outer ring 2 is disposed as fitted on the inner shaft 1 and the inner ring member 14 via two rows of rolling elements 3a, 3b.

The flange 4 of the inner shaft 1 is radially outwardly extended from the outer-side end 10 of the inner shaft 1. A mounting surface 4a for a road-wheel side member, defining an axially outer side of the flange 4, is so turned as to form a plane orthogonal to a shaft center C of the bearing. On the inner-side end 11 of the inner shaft 1, a small diameter portion 7 on which the inner ring member 14 is fitted is formed. An annular stepped surface (butt surface) 8 is formed on an axially outer side of the small diameter portion 7. An intermediate diameter portion 9 is extended axially outwardly from an outer rim of the stepped surface 8. A great diameter portion 12 is formed on the further axially outwardly from the intermediate diameter portion 9. The great diameter portion 12 defines a seal surface for a seal member 13 interposed between the inner shaft 1 and the outer ring 2.

The inner ring member 14 is mounted to the inner shaft 1 as fitted on the small diameter portion 7 which is formed on the inner-side end 11 of the inner shaft 1 and butted against the stepped surface 8. That is, an inner periphery of the inner ring member 14 is in contact with an outer periphery of the small diameter portion 7, while an axially outer side end of the inner ring member 14 is butted against the stepped surface 8. Furthermore, the inner ring member 14 is impressed from the axially inner side toward the axially outer side by means of a caulked portion 15 that is formed by expanding radially outwardly an outer side portion of the inner-side end 11 of the inner shaft 1. Thus, the inner ring member 14 is fitted and fixed on the inner shaft 1 by way of an axial force.

One raceway for the first rolling element 3a is formed on an outer periphery of the inner ring member 14, whereas one raceway for the second rolling element 3b is formed on an outer periphery of the intermediate diameter portion 9 of the inner shaft 1. The first and second rolling elements 3a, 3b may also be tapered rollers rather than the balls shown in FIG. 1.

The outer ring 2 is disposed in a coaxial relation with the inner shaft 1 and includes a cylindrical portion 16 and a flange 17. Two lines of raceways for the first and second rolling elements 3a, 3b are formed on an inner periphery of the cylindrical portion 16. The flange 17 is disposed on an outer peripheral side of the cylindrical portion 16. The flange 17 is connected with a vehicle-body side member, whereby this rolling bearing device for a road-wheel is fixed to a vehicle body. When the rolling bearing device is fixed to the vehicle body, therefore, the flange 4 side of the inner shaft 1 is located on an outer side, whereas the inner ring member 14 side fitted on the inner shaft 1 is located on an inner side.

A guide cylinder 6 is further formed on the outer-side end 10 of the inner shaft 1. The guide cylinder 6 is a cylindrical member that is mounted on a radial inner side portion of the flange 4 and serves as a guide when the road-wheel side member is mounted to the flange 4. The guide cylinder 6 in FIG. 1 includes a cylindrical portion 18 formed on the outer-side end of the inner shaft 1 in a manner to project axially outwardly from the mounting surface 4a of the flange 4. The guide cylinder 6 is formed integrally with the inner shaft 1. Therefore, an internal surface 6a of the guide cylinder 6 defines a closed-end cylindrical portion constituted by an inner periphery 19 of the cylindrical portion 18 and a bottom face 20 defining the axially innermost side thereof.

A process of manufacturing the inner shaft 1 is briefly described. A material is forged into an interim product having a predetermined shape, and the interim product is turned with a lathe turning machine. Subsequently, the inner shaft 1 is obtained by heat treating and polishing the predetermined places of the interim product. The above-mentioned guide cylinder 6 is finished when the interim product is formed by turning. That is, the internal surface 6a of the guide cylinder 6 is a turned surface which is finished not by polishing but only by turning.

The rolling bearing device for a road-wheel of the invention includes a hair-line pattern portion 5 for identifying the manufacturing attribute of the rolling bearing device. In other words, the manufacturing attribute is represented by the hair-line pattern portion 5. The hair-line pattern portion 5 is provided at a part of an outer-side surface of the inner shaft 1. The hair-line pattern portion 5 is formed by turning and enables the manufacturing attribute to be identified based on the difference in the form of hair lines thus formed.

Specifically, the correlation between the form of the hair-line pattern portion 5 formed on the outer side of the inner shaft 1 and the contents (characters) of the manufacturing attribute is previously defined such that the hair-line pattern portion 5 corresponding to the contents of the manufacturing attribute to be represented may be formed on the outer side surface of the inner shaft 1. Thus, the represented contents of the manufacturing attribute can be read by confirming the hair-line pattern portion 5 later. The hair-line pattern portion 5 formed by turning constitutes the surface finished by turning but not subjected to any further machining (polishing). That is, the differences between the patterns of the finished surface on the outer side of the inner shaft 1 provide for the identification of the manufacturing attribute. The manufacturing attribute represented by the hair-line pattern portion 5 include the information on the manufacturing history (including measured data) of a product, a serial number or a lot number thereof, and a numerical quantity thereof. The manufacturing history of the rolling bearing device includes, for example, the date of manufacture, working conditions, a line number of a manufacturing plant and the like. The term "serial number", as used herein, means each different number assigned to each product, whereas the term "lot number", as used herein, means each number assigned to each group of plurality of products manufactured at a predetermined plant in a predetermined period of time. Some rolling bearing devices may be assigned with the lot number as well as the serial number, while the others may be assigned with only the lot number.

The position where the hair-line pattern portion 5 is formed A is described specifically. The hair-line pattern portion 5 is preferably formed on the internal surface 6a of the guide cylinder 6 formed at the radially inner side portion of the flange 4 of the inner shaft 1. That is, the hair-line pattern portion 5 can be formed on the inner periphery 19 of the guide cylinder 6, on the bottom face 20 thereof, or on both of the inner periphery 19 and the bottom face 20 thereof.

The hair-line pattern portion 5 is formed when the internal surface 6a of the guide cylinder 6 is formed by turning. The form of hair lines can be varied by, for example, varying the roughness of the hair lines by varying the feed speed of a turning tool; by temporarily suspending the feed of the turning tool; or by feeding the turning tool as keeping the tool from making contact with the internal surface 6a of the guide cylinder 6 during the finish-machining. Specifically, if the turning tool is fed as keeping the tool from making contact with the internal surface 6a of the guide cylinder 6, discontinuous hair lines are formed. Thus, various patterns of the hair lines of can be formed on the internal surface 6a of the guide cylinder 6 in parallel with the turning of the internal surface 6a of the guide cylinder 6. The hair lines are formed in a circumferential direction centered on the shaft center C (in a spiral form on the inner periphery 19 and in a vertical form on the bottom face 20) on the internal surface 6a of the guide cylinder 6. The hair-line pattern portion 5 extends in a direction orthogonal to the above circumferential direction.

Figure 2:
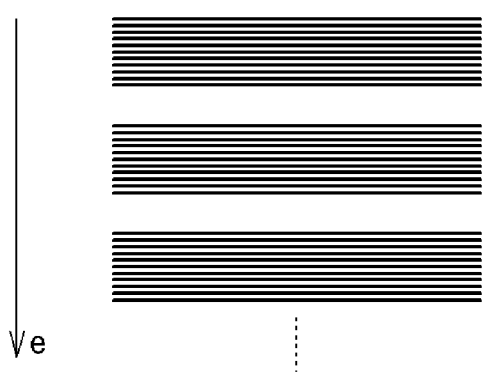
FIG. 2 is a group of diagrams each illustrating a hair-line pattern portion.
Figure 2:
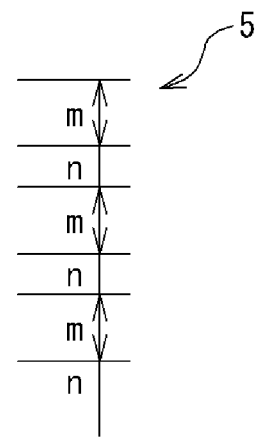
Figure 2:
Figure 2:
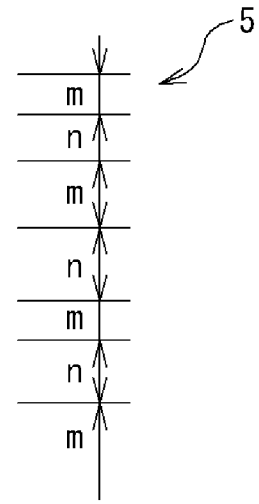

As shown in FIG. 2(a) and FIG. 2(b), for example, various hair-line patterns can be formed by varying the width of the hair lines, the pitch thereof and the like with respect to the tool feeding direction (arrow e). It is noted that the drawings each depict an extracted part of predetermined circumferential width from the inner periphery 19 of the guide cylinder 6 on which the hair-line pattern portion 5 is formed, wherein the hair lines are circumferentially running.

In FIG. 2(a) and FIG. 2(b), a range m represents an area having the hair lines (or on which widely spaced hair lines are formed), whereas a range n represents an area free from hair lines (or on which finely spaced hair lines are formed). The hair-line pattern portion 5 may also be varied by varying the infeed quantity of the tool.

In a case where the date of manufacture is provided as the manufacturing attribute, for example, the hair-line pattern portion 5 is formed as follows. Referring to FIG. 1, the hair-line pattern portion 5 representing the "year" of the date of manufacture is formed, ranging from an open end of the inner periphery 19 of the cylindrical portion 18 of the guide cylinder 6. Subsequently, the hair lines representing the "month" are formed, ranging from the innermost area of the inner periphery 19 of the cylindrical portion 18 to an outer side portion of the bottom face 20. Thereafter, hair lines representing the "day" are formed on an inner side portion of the bottom face 20. Since the hair-line pattern portion 5 is formed by turning, the hair-line pattern portion 5 is defined by circumferential lines. Therefore, if a part of the hair-line pattern portion 5 should be rusted and become less legible, the other part of the circumferential lines permits the identification of the attribute.

Figure 3:
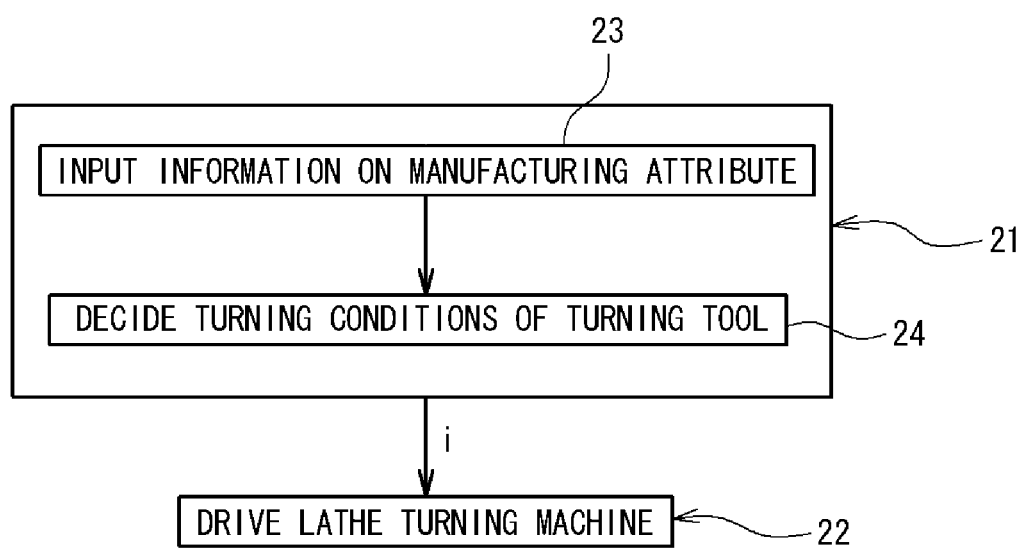
FIG. 3 is a diagram explanatory of a turning apparatus for a bearing member according to one embodiment of the invention.

Next, the turning apparatus for turning the inner shaft 1 as the bearing member constituting the rolling bearing device for a road-wheel shown in FIG. 1 and for forming the hair-line pattern portion 5 which permits the identification of the manufacturing attribute on its inner shaft 1 is described. As the turning apparatus, a lathe turning machine (not shown) normally used for turning the inner shaft 1 can be used. Further referring to FIG. 3, the turning apparatus of the invention includes: a turning condition processing means 21 for controlling the operation of the turning tool of the lathe turning machine; and a turning tool drive means 22 for automatically operating the turning tool. The turning condition processing means 21 can be constituted by a computing unit (computer) capable of storing the inputted information and the processed information and of performing an arithmetic processing on the various information items. The turning tool drive means 22 can be constituted by a motor for moving the turning tool according to a signal from the turning condition processing means 21, and an actuator such as a transmission.

The turning condition processing means 21 includes a storage portion 23 for storing the information on the manufacturing attribute on a bearing member to be subjected to the turning process. The information on the manufacturing attribute is inputted from an external source and can be exemplified by the manufacturing history including the date of manufacture of the rolling bearing device, the working conditions thereof, the line number of the manufacturing plant and the like. The turning apparatus is disposed at a part of the manufacturing line for the bearing member. The information on the manufacturing attribute on a bearing member to be subjected to the turning process is automatically inputted from a managing computing unit (not shown) responsible for the management of the manufacturing line to the storage portion 23 of the turning condition processing means 21.

Alternatively, the information on the manufacturing attribute may be constituted by the information possessed by the turning apparatus itself. That is, the information on the manufacturing attribute may be constituted by the information possessed by the turning condition processing means 21 of the turning apparatus, for example, the information on the date counted by the turning condition processing means 21 itself. The turning condition processing means 21 stores the information in the storage portion 23 thereof.

According to the information on the manufacturing attribute stored in the storage portion 23, the turning condition processing means 21 decides the turning conditions of the turning tool of the lathe turning machine, and generates a tool operation control signal i based on the turning conditions so decided. More specifically, the previously defined correlation between the contents (characters) of the information on the manufacturing attribute and the form of the hair-line pattern portion 5 to be formed on the inner shaft 1 is stored in the storage portion 23. An arithmetic processing portion 24 of the turning condition processing means 21 generates the tool operation control signal I, based on which the turning tool is so operated as to form the hair-line pattern portion 5 corresponding to the contents of the information which is inputted from the external source and is to be represented on the inner shaft 1. Meanwhile, a signal based on which the turning tool is operated to turn the whole body of the inner shaft 1 is added to the tool operation control signal i. The resultant signal is used for performing the turning process. That is, the hair-line pattern portion 5 is formed in parallel with the formation of the whole body of the inner shaft 1 by turning.

According to the tool operation control signal i supplied from the turning condition processing means 21, the turning tool drive means 22 actually operates the turning tool so as to implement the information on the manufacturing attribute in the desired hair-line pattern portion 5 formed on the inner shaft 1. The position to form the hair-line pattern portion 5 on the inner shaft 1 is limited to the internal surface 6a of the guide cylinder 6. Thus, the represented contents (characters) of the information on the manufacturing attribute can be read by confirming the hair-line pattern portion 5 after the completed rolling bearing device is assembled in the vehicle body.

Now, means for confirming the hair-line pattern portion 5 thus formed are described. In a case where the hair-line pattern portion 5 is in a simple form, the contents of the manufacturing attribute may be acquired by checking the hair-line pattern portion with eyes. In an alternative method, the illustration of which is omitted, it is also possible to take an image of the hair-line pattern portion 5 with camera and to process the image for identifying the hair-line pattern portion 5 based on the shading or the white and black areas of the image. According to this method, it is possible to identify the manufacturing attribute even if the hair-line pattern portion 5 is in a complicated form. Besides such optical means, physical means may also be adopted to identify the manufacturing attribute based on the difference in surface roughness at the hair-line pattern portion 5 or on the variation of the surface roughness.

According to the rolling bearing device for a road-wheel of the invention, it is possible to enhance the traceability of the manufacturing attribute and to facilitate the trace thereof. Specifically, the manufacturing attribute, such as the manufacturing history, of the rolling bearing device can be readily identified in a state where the rolling bearing device rests assembled in the vehicle body by removing only a wheel of the road wheel.

Furthermore, according to the turning apparatus of the bearing member of the invention, it is possible to form the hair-line pattern portion for identifying the manufacturing attribute on the bearing member during the turning of the bearing member. Thereby it is possible to reduce the manufacturing man-hours.

Next, a rolling bearing device according to a second embodiment of the invention and a method of manufacturing the same are described with reference to the drawings. The following description is one example where the invention is applied to a hub unit for a driven wheel of a vehicle.

Figure 4:
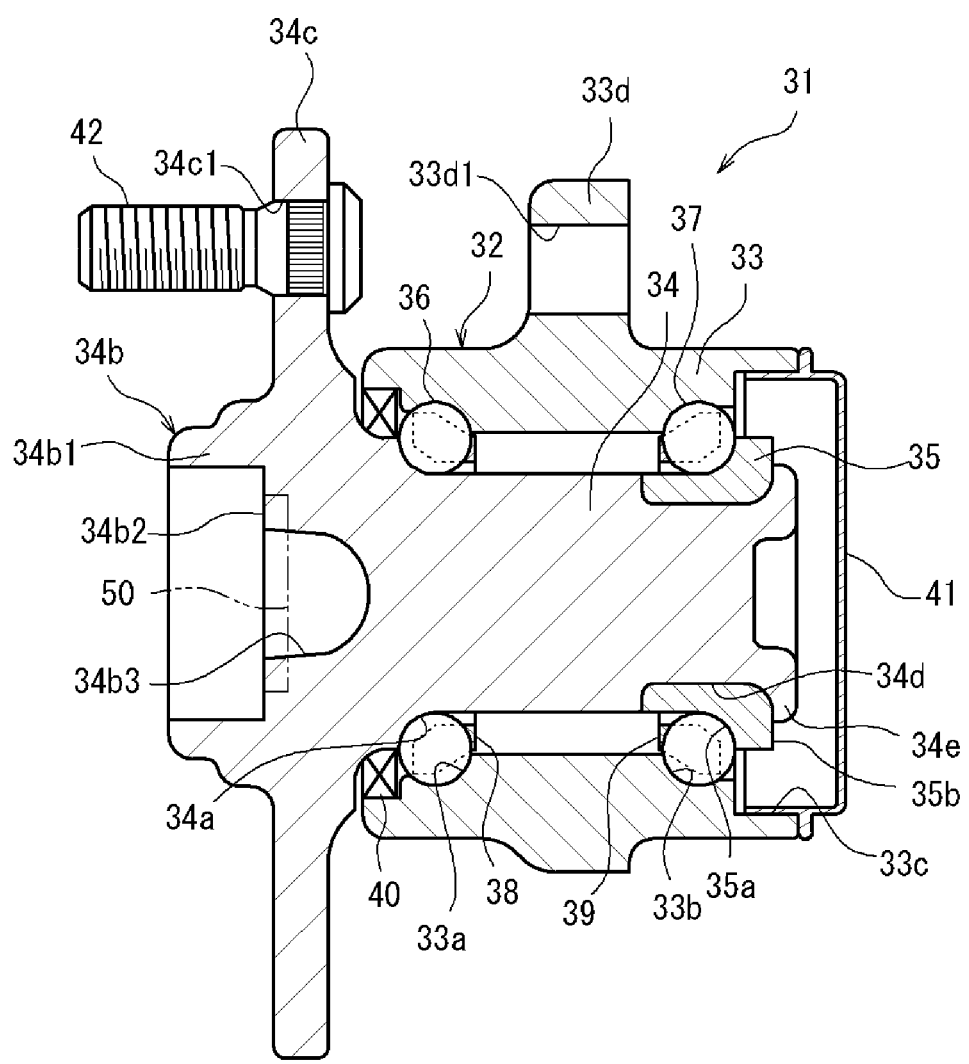
FIG. 4 is a sectional view showing a rolling bearing device for a road-wheel according to the second embodiment of the invention.

FIG. 4 is a sectional view showing a rolling bearing device according to one embodiment of the invention. In the figure, the right-hand side is a vehicular-inner side whereas the left-hand side is a vehicular-outer side (road-wheel side). The rolling bearing device 31 of the embodiment includes a rolling bearing portion 32 of a double-row angular contact ball bearing type. Specifically, the rolling bearing device 31 includes: an outer ring 33; an inner shaft (hub wheel) 34 as a shaft body; an inner ring member 35; and rolling elements 36, 37 constituted by a plurality of balls. The rolling bearing device 31 further includes: cages 38, 39 respectively retaining the rolling elements 36, 37 circumferentially arranged with predetermined spacing; and a seal member 40 interposed in space between the outer ring 33 and the inner shaft 34.

The above-mentioned outer ring 33 is a fixed bearing ring fixed to the vehicle body and double-row outer raceways 33a, 33b are formed on an inner peripheral side thereof. On the other hand, a rotary bearing ring is constituted by the inner shaft 34 and the inner ring member 35. An inner raceway 34a is formed at the place of the inner shaft 34 facing the outer raceway 33a such that the rolling element 36 can roll between the inner raceway 34a and the outer raceway 33a. An inner raceway 35a is formed at the place of the inner ring member 35 facing the outer raceway 33b such that the rolling element 37 can roll between the inner raceway 35a and the outer raceway 33b. Thus, the rolling bearing device 31 of the embodiment constitutes the so-called third generation hub unit wherein an outer periphery of the inner shaft 34 constitutes one inner raceway 34a of the double-row raceways.

A cylindrical portion extended axially is formed on a vehicular-inner side of the outer ring 33. A cover 41 of a closed-end shape for closing an interior of the bearing is pressed into an inner periphery 33c of the cylindrical portion. In the rolling bearing device 31, the cover 41 seals the annular opening between the inner and outer rings from the vehicular-inner side and, together with the above-mentioned seal member 40 that seals the annular opening from the vehicular-outer side, prevents muddy water and foreign substances from entering the bearing interior.

A flange 33d extended radially outwardly is further formed on the outer ring 33. A knuckle portion (not shown) included in a suspension system of the above-mentioned vehicle is fixed to the flange 33d by means of a bolt (not shown) to be inserted through a bolt-hole 33d1 formed therethrough.

A stepped portion 34d is formed on a vehicular-inner side (one end side) of the inner shaft 34, and the above-mentioned inner ring member 35 is fitted on the stepped portion 34d. The inner ring member 35 is fixed to the inner shaft 34 by means of a caulked portion 34e which is formed by a caulking step, to be described hereinafter, in which a cylindrical portion formed at a distal end of the stepped portion 34d is bent and deformed in a radially outward direction.

A socket part 34b and a flange 34c for mounting a road-wheel are further formed on a vehicular-outer side (the other end side) of the inner shaft 34. A plurality of hub bolts 42 for fixing a disc rotor of a brake system of the above-mentioned vehicle and the wheel (not shown) of the road wheel and the like are pressed and fixed onto the flange 34c.

The above-mentioned socket part 34b is open toward the vehicular-outer side. On the socket part 34b, a cylindrical portion 34b1 to be pressed against the road wheel at its outer periphery; a ring-shaped bottom portion 34b2 surrounded by the cylindrical portion 34b1; and a concave portion 34b3 axially inwardly concaved from the bottom portion 34b2 are formed. The cylindrical portion 34b1, the bottom portion 34b2, the concave portion 34b3 and the flange 34c are disposed in a concentric relation with respect to the axial direction of the rolling bearing portion 32.

A ring-shaped axial end face of the bottom portion 34b2 is a surface visually observable from outside even when the rolling bearing device 31 is assembled in the vehicle. Hence, this surface is provided with an identification information representing portion 50. As will be described hereinafter, the identification information indicating the existence of the caulked portion 34e is on the identification information representing portion 50 by die-stamping (embossing) during a caulking step of forming the above-mentioned caulked portion 34e.

Also referring to FIG. 5 to FIG. 8, the caulking step including a die-stamping operation for die-stamping the above-mentioned identification information is described specifically.

Figure 5:
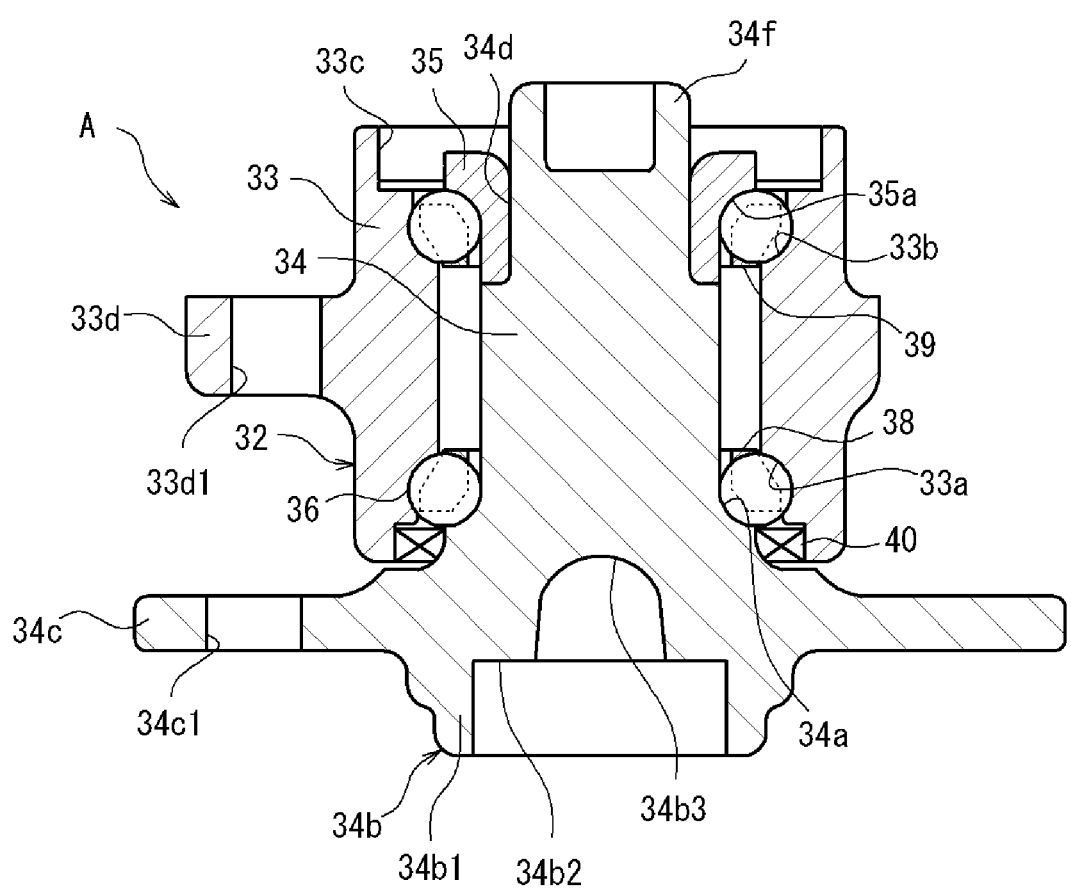
FIG. 5 is a sectional view showing an essential part of the above-mentioned rolling bearing device in a state where a caulked portion shown in FIG. 4 is yet to be formed.

In a preform A of the rolling bearing device prior to the caulking step, as shown in FIG. 5, the outer ring 33 and the inner ring member 35 which both are composed of a bearing steel or the like and the other bearing components such as the rolling elements 36, 37 are assembled to the inner shaft 34. This inner shaft 34 is composed of a carbon steel (S55C) or a bearing steel or the like. A cylindrical portion 34f for forming the caulked portion 34e is formed at one end side of the inner shaft 34. The cylindrical portion 34f is formed in a concentric relation with the individual parts 34b1 to 34b3 of the socket part 34b and the flange 34c at the other end side of the inner shaft 34 with respect to the axial direction of the rolling bearing portion 32. The one end side and the other end side of the inner shaft 34 of the preform A are so positioned as to be directed upwardly and downwardly respectively, as shown in FIG. 5. Then the preform A is subjected to the caulking step using a caulking jig 52 shown in FIG. 6.

Figure 6:
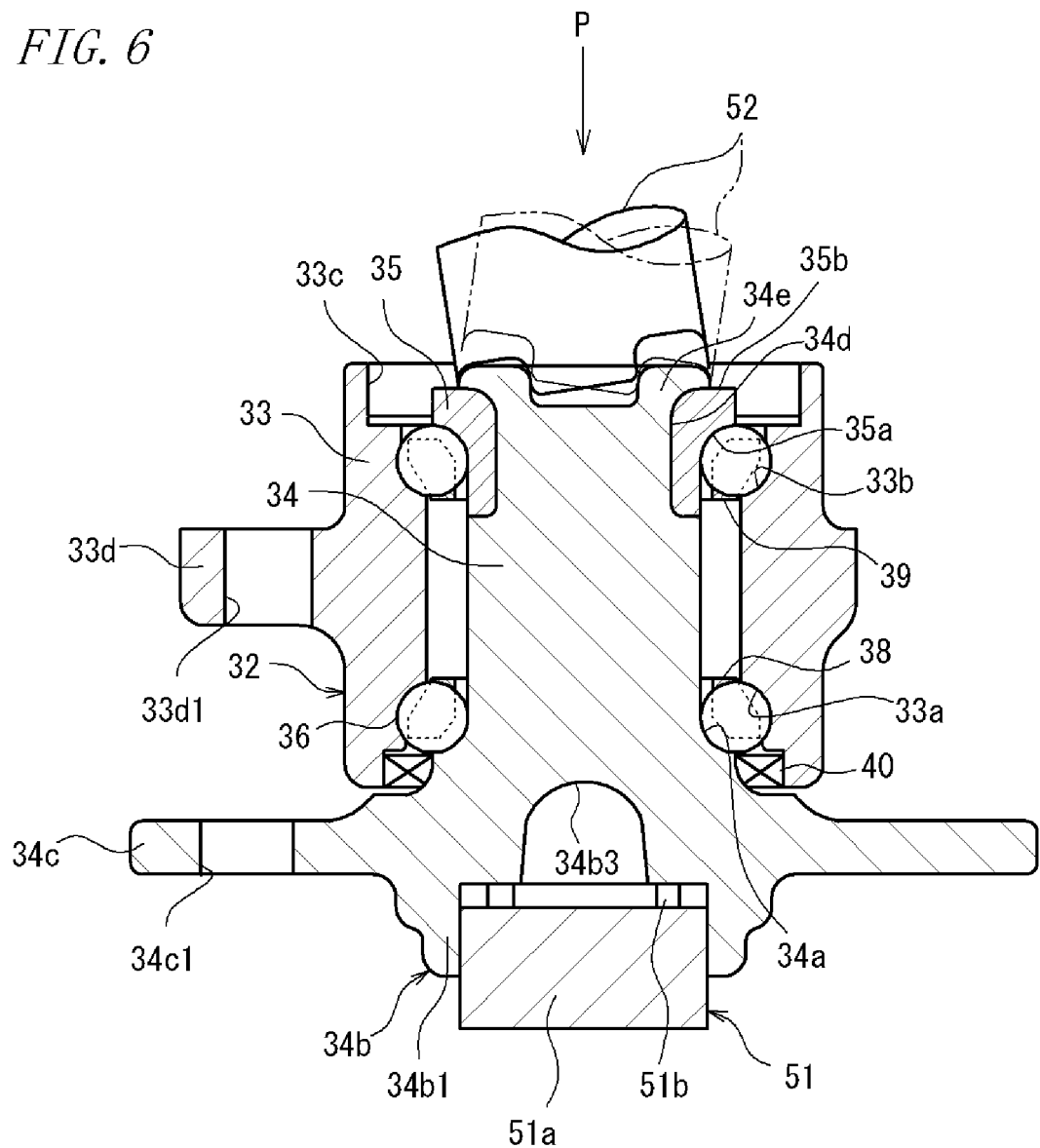
FIG. 6 is a sectional view showing the essential part of the above-mentioned rolling bearing device during the caulking step for forming the above-mentioned caulked portion.

In the caulking step as shown in FIG. 6, the caulking jig 52 is so positioned as to be pressed against the above-mentioned cylindrical portion 34f (FIG. 5). As indicated by the solid line and alternate long and two short dashes line in FIG. 6, the caulking jig 52 is brought into a rolling motion as subjected to a predetermined caulking pressure P acting from the one end side of the inner shaft 34 toward the other end side thereof, as indicated by the arrow in FIG. 6. Thus, the cylindrical portion 34f is bent and deformed in the radially outward direction, so as to be caulked to an axial end face 35b of the inner ring member 35 whereby the caulked portion 34e is formed.

In the caulking step, an identification information imparting jig 51 which imparts the identification information indicating the existence of the caulked portion 34e so formed is pressed against a surface of the bottom portion 34b2. The identification information imparting jig 51 has the function of a holder jig for ensuring a stable execution of the caulking step. A lower surface of the identification information imparting jig 51 is positioned on a work table (not shown) and its upper surface side is brought into contact with the surface of the bottom portion 34b2, so that the caulking step is carried out in a state where the surface of the bottom portion defines a surface receiving the caulking pressure P at the other end side of the inner shaft 34. The identification information imparting jig 51 uses the caulking pressure P to die-stamp the above-mentioned identification information on the surface of the bottom portion 34b2.

Figure 7:
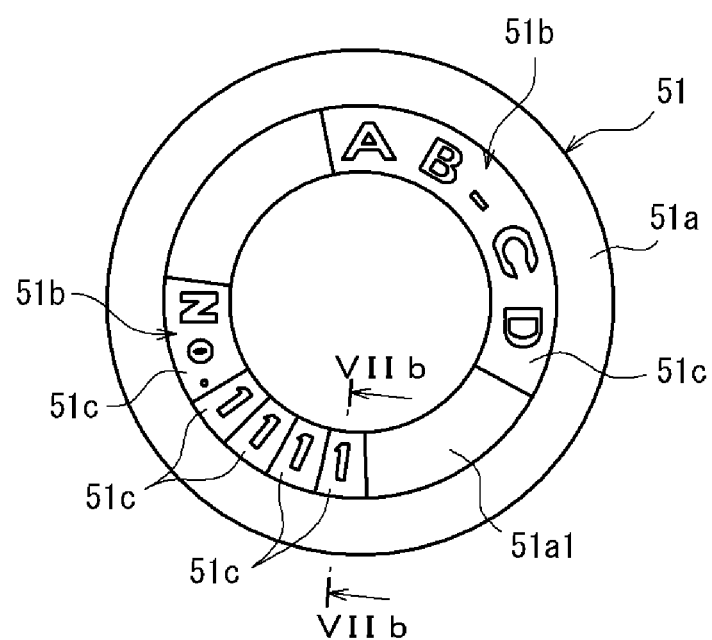
FIG. 7($a$) is a plan view showing an identification information imparting jig shown in FIG. 6, and FIG. 7($b$) is a sectional view taken on the line VIIb-VIIb in FIG. 7($a$)
Figure 7:
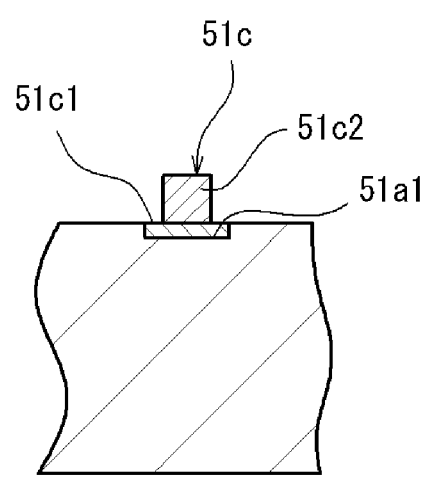

In particular, also referring to FIG. 7, the identification information imparting jig 51 includes: a column-shaped main body 51a which is inserted in the cylindrical portion 34b1 of the socket part 34b; and an imparting portion 51b which is so provided as to project upwardly from an upper face of the main body 51a and which practically imparts the identification information to the surface of the bottom portion 34b2. The identification information imparting jig 51 is composed of a material (such as an ultrahard material) harder than the material of the inner shaft 34. The identification information imparting jig 51 uses the caulking pressure P to (compress and) deform the bottom portion 34b2, and thereby embosses the identification information on the surface of the bottom portion.

The above-mentioned imparting portion 51b includes a plurality of die-stamping parts 51c for die-stamping a name of a bearing manufacturer and a manufacturing lot number as the identification information, for example. Marks exemplified by the alphabetic letters or numerals constituting the above-mentioned manufacturer's name and such are formed on the individual die-stamping parts 51c. As illustrated by FIG. 7(b), the die-stamping part 51c includes: an approximate fan-shaped base portion 51c1; and a die-stamping portion 51c2 which is so provided as to project from the base portion 51c1 and which die-stamps a mark such as a corresponding numeral or the like by being pressed into the bottom portion 34b2. In the die-stamping part 51c, the base portion 51c1 thereof is removably mounted in a ring-shaped concave portion 51a1 formed on an upper surface of the main body 51a. Thus, it is possible to easily deal with the change of the identification information such as the above-mentioned lot number.

Figure 8:
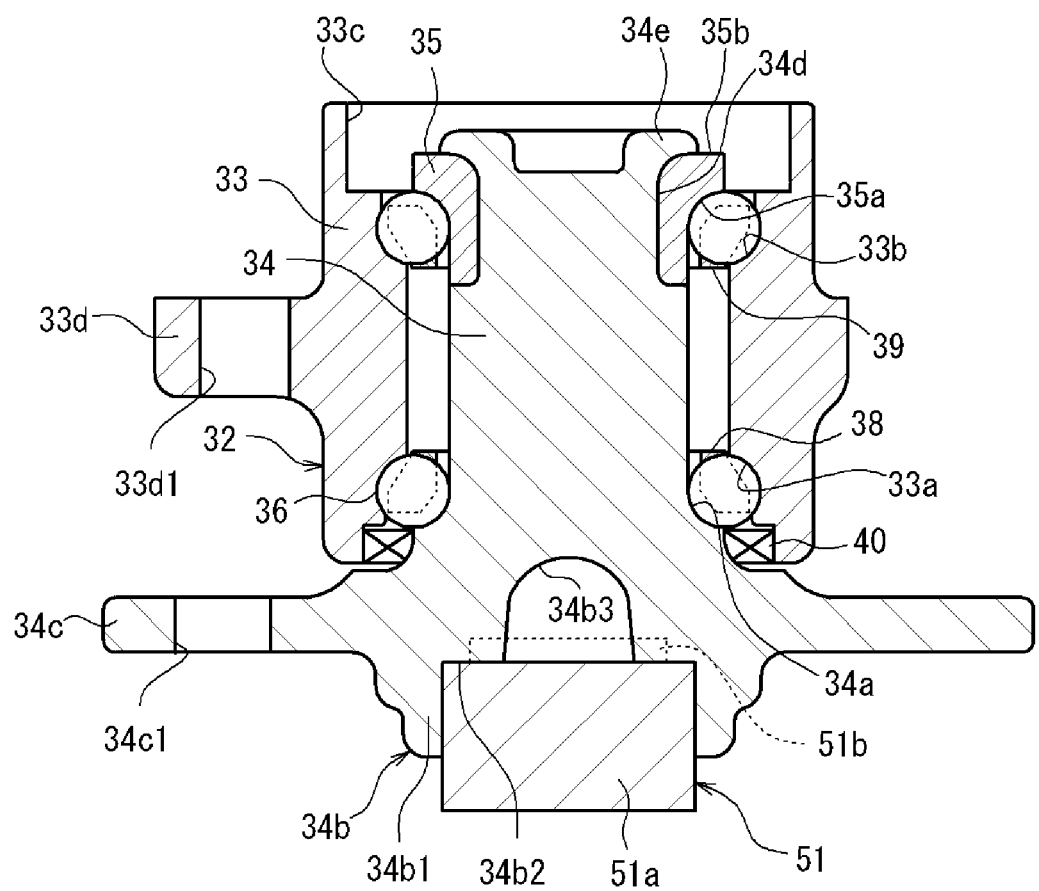
FIG. 8 is a sectional view showing the essential part of the above-mentioned rolling bearing device at the time of completion of the above-mentioned caulking step.
Figure 9:
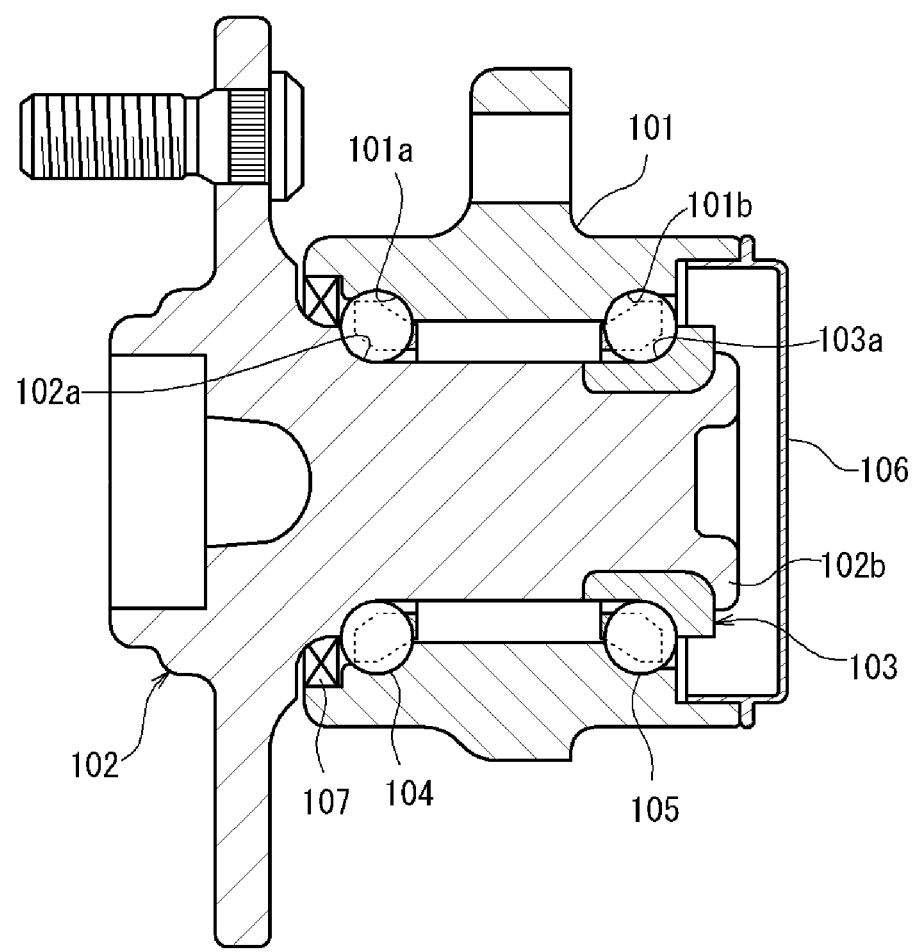
FIG. 9 is a sectional view showing a conventional rolling bearing device.

When the caulking step is completed, at the one end side of the inner shaft 34, the caulked portion 34e is caulked to the axial end face 35b of the inner ring member 35 as shown in FIG. 8, whereby the inner ring member 35 is prevented from disengaging from the inner shaft 34 and whereby the rolling bearing portion 32 is prevented from falling off as applied with a predetermined pre-load.

At the other end side of the inner shaft 34, the caulking pressure P works so that the imparting portion 51b that includes the plural die-stamping parts 51c and is pressed against the surface of the bottom portion 34b2 (FIG. 6) is brought into a state where the respective die-stamping portions 51c2 of the die-stamping parts 51c are pressed into the inside of the bottom portion 34b2 (FIG. 8). Thus, the identification information is automatically formed on the above-mentioned identification information representing portion 50 (FIG. 4) at the same time as the formation of the caulked portion 34e is completed.

According to the embodiment constituted as described above, the identification information indicating the existence of the caulked portion 34e so formed is die-stamped on the visually observable surface of the bottom portion 34b2 on the other end side of the inner shaft (shaft body) 34. Therefore, the existence or nonexistence of the caulked portion 34e can be easily determined from the identification information even when the cover 41 is mounted to the one end side of the inner shaft 34 so as to cover the caulked portion 34e. In addition, the identification information is automatically die-stamped under the caulking pressure P at the same time as the caulking step is completed. Therefore, the man-hours of manufacturing the rolling bearing device can be reduced by omitting an additional operation for die-stamping the identification information and the increase in cost of the bearing device is prevented. It is also possible to omit the visual inspection of the conventional example wherein the phototube is used to check for the existence or nonexistence of the caulked portion 34e.

According to the embodiment, as shown in FIG. 6, the bottom portion 34b2 is disposed in a concentric relation with the cylindrical portion 34f to which the caulking pressure P is subjected, and on the side to which the caulking pressure P is directed. The identification information imparting jig 51 is pressed against the visually observable surface of the bottom portion 34b2 so as to display the identification information on the identification information representing portion 50 defined by the visually observable surface. Therefore, even when the rolling bearing device 31 is assembled in the vehicle by connecting the outer periphery of the cylindrical portion 34b1 and the other side face of the flange 34c to the road wheel side of the vehicle, the existence of the caulked portion 34e so formed can be readily confirmed by visually checking the identification information representing portion 50. The identification information imparting jig 51 serving as the jig for receiving the caulking pressure P can be used to ensure that the caulking step including the die-stamping operation for stamping the identification information is carried out in a more stable manner. In addition, the identification information imparting jig 51 is capable of efficiently using the caulking pressure P for clearly die-stamping the identification information. What is more, the identification information is die-stamped on the visually observable surface and hence, it is easy to determine the existence or nonexistence of the caulked portion 34e not only in the manufacturing process of the rolling bearing device 31 but also during the course of distribution or after the bearing device is assembled in a product.

In an alternative constitution to that of the above-mentioned embodiment, the identification information imparting jig including the ring-shaped main body may be pressed against the axial end face of the cylindrical portion 34b1 of the inner shaft 34 or the other end side face of the flange 34c, and then the identification information may be die-stamped on the axial end face or the other end surface by using the caulking pressure P applied during the caulking step. However, it is more preferred to die-stamp the identification information on the surface of the bottom portion 34b2 as described above, because the identification information on the surface of the bottom portion provides the easy determination on the existence or nonexistence of the caulked portion 34e after the rolling bearing device 31 is assembled in the vehicle, because the influence of the die-stamping operation on the inner shaft 34 is minimized, and because the surface of the bottom portion affords a sufficient space for permitting a large number of information items to be clearly die-stamped. In other words, in a case where the identification information is provided on the axial end face of the cylindrical portion 34b1, the identification information may be detrimentally implemented in marks too small to be readable because the axial end face has a smaller area than the surface area of the bottom portion 34b2. In a case where the identification information is provided on the other end side surface of the flange 34c, the flatness or roundness of the flange 34 may be impaired by the caulking pressure P and the flange run-out or the like may result.

According to the embodiment, the above-mentioned identification information is constituted by the manufacturing information specific to the rolling bearing device 31 as shown in FIG. 7. This permits one of the operations for separately die-stamping these information items to be omitted so that the die-stamping operation can be accomplished in one step. Hence, the man-hours of manufacturing the rolling bearing device 31 can be reduced. Since the manufacturing information specific to the bearing device is used as the identification information, the information enables it to trace (trace and manage) the manufacturing history including the manufacturer, the part number, the date of manufacture, the location of manufacture and the like of the rolling bearing device 31 as well as the usage history thereof including the operating time and the like. Thus is provided the rolling bearing device 31 featuring good traceability.

The above-mentioned description illustrates the case where the invention is applied to the hub unit for the driven wheel of the vehicle, wherein the hub unit is equipped with the rolling bearing of the double-row angular ball bearing type. However, the invention is applicable to any rolling bearing device in which the caulked portion is formed at the one end side of the shaft body, and the inner ring member is fixed to the shaft body, and in which the identification information indicating the existence of the caulked portion so formed is die-stamped on the visually observable surface at the other end side of the shaft body. Accordingly, the bearing type including the type of rolling element, the number of provided rolling elements and such; the shape of the shaft body including the provision of the flange and such; the provision of the cover; and the like are not limited to those described above. Specifically, the invention is applicable to a rolling bearing device constituting a hub unit for a driving wheel of a vehicle. The invention is also applicable to a bearing device employing a tapered roller as the rolling element. The invention is further applicable to a rolling bearing device wherein a pair of inner ring members are fitted fixed on an outer periphery of the shaft body, as well as to a sensor-equipped rolling bearing device incorporating therein a sensor unit in which an object member to be detected by a sensor is mounted to the rotary bearing ring side and the sensor is mounted to the cover.

The foregoing description illustrates the case where the identification information imparting jig in which the die-stamping part including the die-stamping portion projected from the main body surface is removably mounted in the ring-shaped concave portion formed in the main body surface is used to die-stamp the identification information on the inner side of the bottom portion at the other end side of the shaft body, so that the identification information representing portion with the die-stamped identification information is provided on the visually observable surface of the bottom portion. However, the identification information imparting jig of the invention may be anything that is capable of die-stamping the identification information by using the caulking pressure. Hence, the constitution, shape and the like of the above-mentioned imparting jig are not limited to those described above. For instance, the identification information imparting jig may include a die-stamping portion concaved from the above-mentioned main body surface, such as to emboss the identification information and hence, the identification information representing portion including the embossed identification information may be provided.

According to the invention, the identification information indicating the existence of the caulked portion so formed is automatically die-stamped on the visually observable surface at the other end side of the shaft body in conjunction with the formation of the caulked portion at the one end side of the shaft body. Therefore, even in the cover is so mounted as to cover the caulked portion, it is easy to determine the existence or nonexistence of the caulked portion.

What is claimed is:

1. A rolling bearing device for a road-wheel comprising: an inner shaft that is provided with, on its outer-side end, a flange on which a road-wheel side member is mounted; and an outer ring disposed around the inner shaft, wherein the inner shaft has, on its outer side, a hair-line pattern portion that is formed by turning and that permits a manufacturing attribute of the bearing device to be identified based on a difference in the form of hair lines so formed.

2. The rolling bearing device for a road-wheel according to claim 1, wherein the hair-line pattern portion is formed on an internal surface of a guide cylinder which is disposed at an inner side portion of the flange and serves as a guide during mounting the road-wheel side member to the flange.

3. A turning apparatus for a bearing member comprising: turning condition processing means for deciding turning conditions of a turning tool according to information about a manufacturing attribute on the bearing member and generating a tool operation control signal based on the turning conditions; and turning tool drive means for operating the turning tool according to the tool operation control signal provided by the turning condition processing means, thereby implementing the information about the manufacturing attribute in a hair-line pattern portion which is formed by turning the bearing member, and which permits the manufacturing attribute to be identified based on a difference in a form of hair lines so formed.

4. A rolling bearing device for a road-wheel which comprises: an outer ring; an inner ring member; rolling elements arranged between the outer ring and the inner ring member; and a shaft body having the inner ring member mounted to an outer periphery thereof and in which a caulked portion to be caulked to an axial end face of the inner ring member is formed at one end side of the shaft body, thereby fixing the inner ring member and the shaft body, wherein the caulked portion is caulked to the axial end face of the inner ring member by performing a caulking process in which a cylindrical portion formed at the one end side of the shaft body is radially outwardly bent and deformed by using a predetermined caulking pressure acting from the one end side toward the other end side of the shaft body, and wherein identification information indicating an existence of the caulked portion so formed is die-stamped on a visually observable surface at an other end side of the shaft body by using the caulking pressure of the caulking process.

5. The rolling bearing device for a road-wheel according to claim 4, wherein the rolling bearing device includes: at the other end of the shaft body, a flange which is disposed in a concentric relation with the cylindrical portion at its one end and connected to the road-wheel side of a vehicle; and a socket part having a cylindrical portion disposed in a concentric relation with the cylindrical portion and pressed against the road-wheel side at its outer periphery, and a bottom portion enclosed by the cylindrical portion, and wherein the identification information is die-stamped on a surface of the bottom portion.

* * * * *